(12) United States Patent
Tone

(10) Patent No.: US 12,026,419 B2
(45) Date of Patent: Jul. 2, 2024

(54) DISPLAY CONTROL METHOD AND DISPLAY DEVICE

(71) Applicant: SEIKO EPSON CORPORATION, Tokyo (JP)

(72) Inventor: Takehiko Tone, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/191,322

(22) Filed: Mar. 28, 2023

(65) Prior Publication Data

US 2023/0315377 A1 Oct. 5, 2023

(30) Foreign Application Priority Data

Mar. 29, 2022 (JP) ................. 2022-053044

(51) Int. Cl.
*G09G 5/12* (2006.01)
*G06F 3/14* (2006.01)

(52) U.S. Cl.
CPC ............ *G06F 3/1446* (2013.01); *G09G 5/12* (2013.01)

(58) Field of Classification Search
CPC ........................................ G09G 5/12
See application file for complete search history.

(56) References Cited

U.S. PATENT DOCUMENTS

2012/0075334 A1* 3/2012 Pourbigharaz ........ G06F 3/1438 345/619
2021/0375234 A1* 12/2021 Lei .................... G06F 3/1446

FOREIGN PATENT DOCUMENTS

JP 2017-049544 A 3/2017
JP 2018-152678 A 9/2018

OTHER PUBLICATIONS

Examples of BrightSign & GeoBox Combinations; Japan Material Co. Ltd.; pp. 1-8.

* cited by examiner

*Primary Examiner* — Nan-Ying Yang
(74) *Attorney, Agent, or Firm* — Oliff PLC

(57) ABSTRACT

A display control method includes: acquiring a standard time; synchronizing an internal time referred to in processing by one display device with the standard time; detecting a reference time, which is the internal time when an image represented by an input image signal satisfies a predetermined condition; outputting the reference time to another display device of a plurality of display devices; acquiring a reference time detected in the another display device; and delaying a vertical synchronization signal by a time period from the reference time of the one display device to the reference time of the another display device, when the reference time of the another display device is later than the reference time of the one display device.

3 Claims, 7 Drawing Sheets

DISPLAY CONTROL METHOD AND DISPLAY DEVICE

The present application is based on, and claims priority from JP Application Serial Number 2022-053044, filed Mar. 29, 2022, the disclosure of which is hereby incorporated by reference herein in its entirety.

BACKGROUND

1. Technical Field

The present disclosure relates to a display control method and a display device.

2. Related Art

According to the related art, a multi-projection technique in which one image is displayed using a plurality of projectors is known. In the execution of multi-projection, when a plurality of image output devices output an image to projectors corresponding one-to-one to the image output devices, vertical synchronization signals outputted from the image output devices to the projectors are usually not synchronized with each other. Consequently, a lag in the display may occur between the plurality of projectors.

Also, when a plurality of projectors play back one image by using a content playback function provided in each projector, vertical synchronization signals generated in the projectors are not synchronized with each other and therefore a lag in the display may occur between the plurality of projectors.

With respect to the synchronization of vertical synchronization signals between projectors, JP-A-2017-49544 discloses a technique for synchronizing the display between a plurality of projectors. Specifically, in the technique according to JP-A-2017-49544, first, the plurality of projectors synchronize an internal time thereof, which is referred to in the operation of each projector. Next, the plurality of projectors cause the phase of a reference vertical synchronization signal to coincide between the projectors, based on the synchronized internal time. Finally, each projector causes the phase of a display vertical synchronization signal to coincide with the phase of the reference vertical synchronization signal having the closest phase. Thus, the phase of the display vertical synchronization signal becomes the same between the plurality of projectors and the display is synchronized between the plurality of projectors.

However, in the technique according to JP-A-2017-49544, the initial lag between the phase of the display vertical synchronization signal and the phase of the reference vertical synchronization signal is within one frame of image frames displayed by the projector. Therefore, in the technique according to JP-A-2017-49544, the range within which the phaser can be adjusted is up to one frame. That is, there is a problem in that, when a lag of one frame or more between projectors occurs in an image signal itself inputted to each of the plurality of projectors, the technique according to JP-A-2017-49544 cannot cope with this lag, resulting in the playback of the image in which the lag remains.

SUMMARY

According to an aspect of the present disclosure, a display control method for controlling one display device of a plurality of display devices in a system for synchronizing images displayed by the plurality of display devices is provided. The display control method includes: acquiring a standard time; synchronizing an internal time referred to in processing by the one display device with the standard time; detecting a reference time, which is the internal time when an image represented by an input image signal satisfies a predetermined condition; outputting the reference time to another display device of the plurality of display devices; acquiring a reference time detected in the another display device; delaying a vertical synchronization signal by a time period from the reference time of the one display device to the reference time of the another display device, when the reference time of the another display device is later than the reference time of the one display device; and displaying the image represented by the input image signal, using the delayed vertical synchronization signal.

According to another aspect of the present disclosure, a display control method for controlling one display device of a plurality of display devices in a system for synchronizing images displayed by the plurality of display devices is provided. The display control method includes: acquiring a standard time; synchronizing an internal time referred to in processing by the one display device with the standard time; measuring a reference time period, which is a time period until a vertical synchronization signal is generated for the first time after the internal time reaches a first time; outputting the reference time period to another display device of the plurality of display devices; acquiring the reference time period from the another display device; delaying the vertical synchronization signal by a time period of a difference between the reference time period of the one display device and the reference time period of the another display device, when the reference time period of the another display device is longer than the reference time period of the one display device; and displaying an image represented by an input image signal, using the delayed vertical synchronization signal.

According to still another aspect of the present disclosure, a display device that is one display device of a plurality of display devices in a system for synchronizing images displayed by the plurality of display devices is provided. The display device includes: a first acquirer acquiring a standard time; a synchronizer synchronizing an internal time referred to in processing by the one display device with the standard time; a detector detecting a reference time, which is the internal time when an image represented by an input image signal satisfies a predetermined condition; an outputter outputting the reference time to another display device of the plurality of display devices; a second acquirer acquiring a reference time detected in the another display device; a delayer delaying a vertical synchronization signal by a time period from the reference time of the one display device to the reference time of the another display device, when the reference time of the another display device is later than the reference time of the one display device; and a display controller displaying the image represented by the input image signal, using the delayed vertical synchronization signal.

According to still another aspect of the present disclosure, a display device that is one display device of a plurality of display devices in a system for synchronizing images displayed by the plurality of display devices is provided. The display device includes: a first acquirer acquiring a standard time; a synchronizer synchronizing an internal time referred to in processing by the one display device with the standard time; a measurer measuring a reference time period, which is a time period until a vertical synchronization signal is generated for the first time after the internal time reaches a first time; an outputter outputting the reference time period to another display device of the plurality of display devices; a second acquirer acquiring the reference time period from the another display device; a delayer delaying the vertical synchronization signal by a time period of a difference between the reference time period of the one display device and the reference time period of the another display device, when the reference time period of the another display device is longer than the reference time period of the one display device; and a display controller displaying an image represented by an input image signal, using the delayed vertical synchronization signal.

DESCRIPTION OF EXEMPLARY EMBODIMENTS

A display control method and a display device according to embodiments will now be described with reference to the drawings. In each drawing, the dimension and scale of each part are suitably changed from the actual dimension and scale. The embodiments described below are preferred specific examples and therefore include various technically preferable limitations. However, the scope of the present disclosure is not limited to these embodiments unless the description below includes any particular description to limit the present disclosure.

Figure 1:
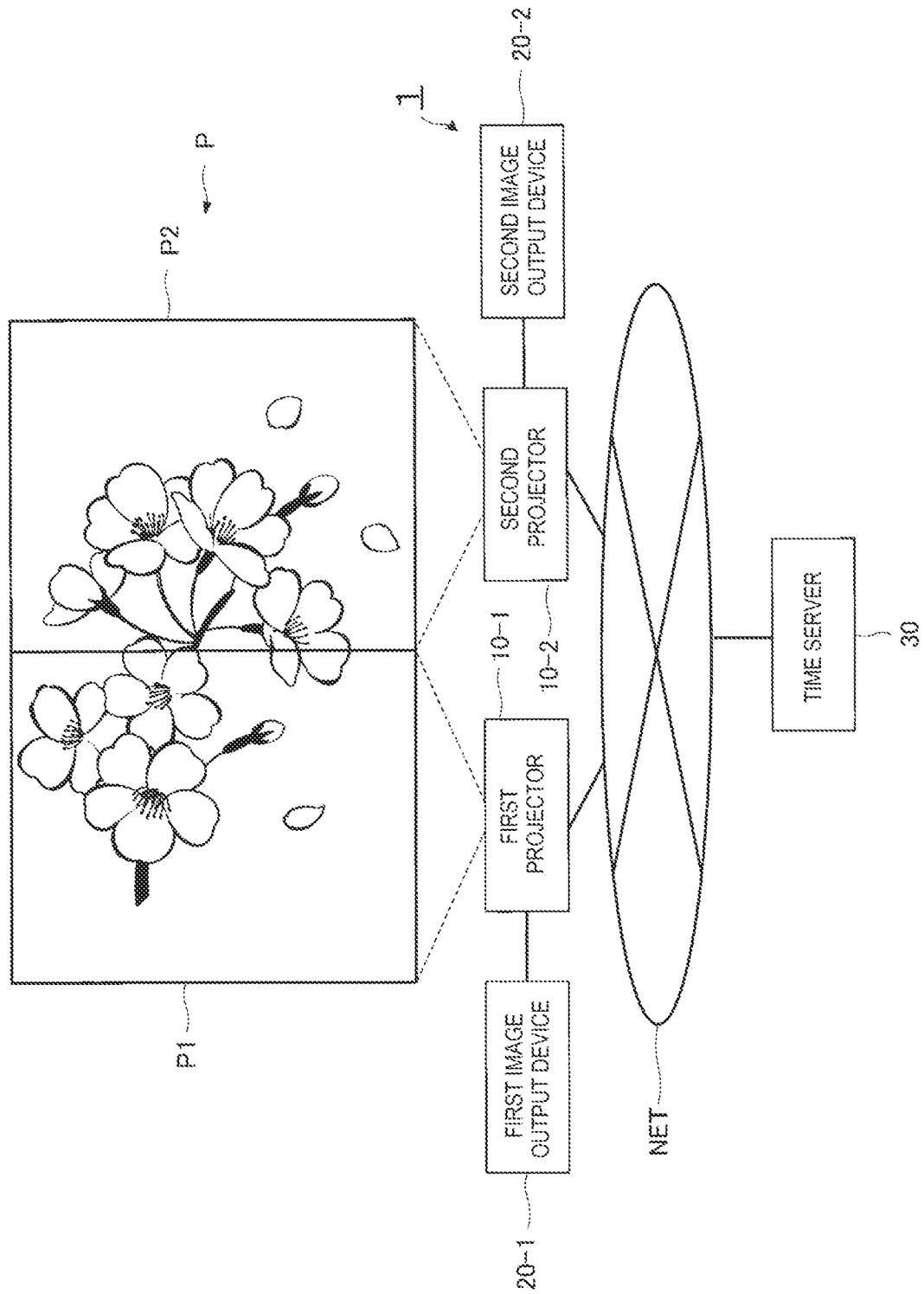
FIG. 1 is a block diagram showing the configuration of a display control system according to a first embodiment.

1: FIRST EMBODIMENT 1-1: Configuration of Embodiment
1-1-1: Overall Configuration FIG. 1 is a block diagram showing the configuration of a display control system 1 according to a first embodiment. The display control system 1 executes multi-projection using a plurality of projectors.

The display control system 1 has a first projector 10-1 projecting a first image P1 and a second projector 10-2 projecting a second image P2, as projectors projecting an image onto a flat surface such as a screen or a wall. The first image P1 and the second image P2 together form one image P. In this specification, the first projector 10-1 is an example of a "first display device". The second projector 10-2 is an example of a "second display device". The first projector 10-1 and the second projector 10-2 are, in general, an example of a "display device".

The first projector 10-1 and the second projector 10-2 may be installed in such a way that the projection surfaces thereof to project onto a wall or a screen are spaced apart from each other, are into contact with each other, or share a partial area.

In an example, the display control system 1 has the two projectors of the first projector 10-1 and the second projector 10-2. However, the number of projectors provided in the display control system 1 may be any plural number.

The display control system 1 has a first image output device 20-1 and a second image output device 20-2. The first image output device 20-1 is communicatively coupled to the first projector 10-1, for example, via an HDMI (High-Definition Multimedia Interface) cable. Similarly, the second image output device 20-2 is communicatively coupled to the second projector 10-2, for example, via an HDMI cable. "HDMI" is a registered trademark.

A first input image signal serving as the source of the first image P1 is inputted to the first projector 10-1 from the first image output device 20-1. Similarly, a second input image signal serving as the source of the second image P2 is inputted to the second projector 10-2 from the second image output device 20-2.

A first frame of the first input image signal corresponds to a first frame of the second input image signal. Similarly, an n-th frame of the first input image signal corresponds to an n-th frame of the second input image signal. Here, n is a natural number.

Also, a first input vertical synchronization signal is inputted to the first projector 10-1 from the first image output device 20-1. Similarly, a second input vertical synchronization signal is inputted to the second projector 10-2 from the second image output device 20-2. The first input vertical synchronization signal and the second input vertical synchronization signal are not synchronized with each other. Consequently, the first input image signal and the second input image signal are not synchronized with each other. In other words, there is a lag between the time when the n-th frame of the first input image signal is inputted to the first projector 10-1 and the time when the n-th frame of the second input image signal is inputted to the second projector 10-2.

The "first input vertical synchronization signal" and the "second input vertical synchronization signal" are an example of a vertical synchronization signal The display control system 1 also has a time server 30. The time server 30 measures a standard time serving as the standard in the display control system 1.

As shown in FIG. 1, the first projector 10-1, the second projector 10-2, and the time server 30 are communicatively coupled to each other via a communication network NET. The time server 30 provides the standard time to the first projector 10-1 and the second projector 10-2 via the communication network NET.

1-1-2: Configuration of First Projector 10-1

Figure 2:
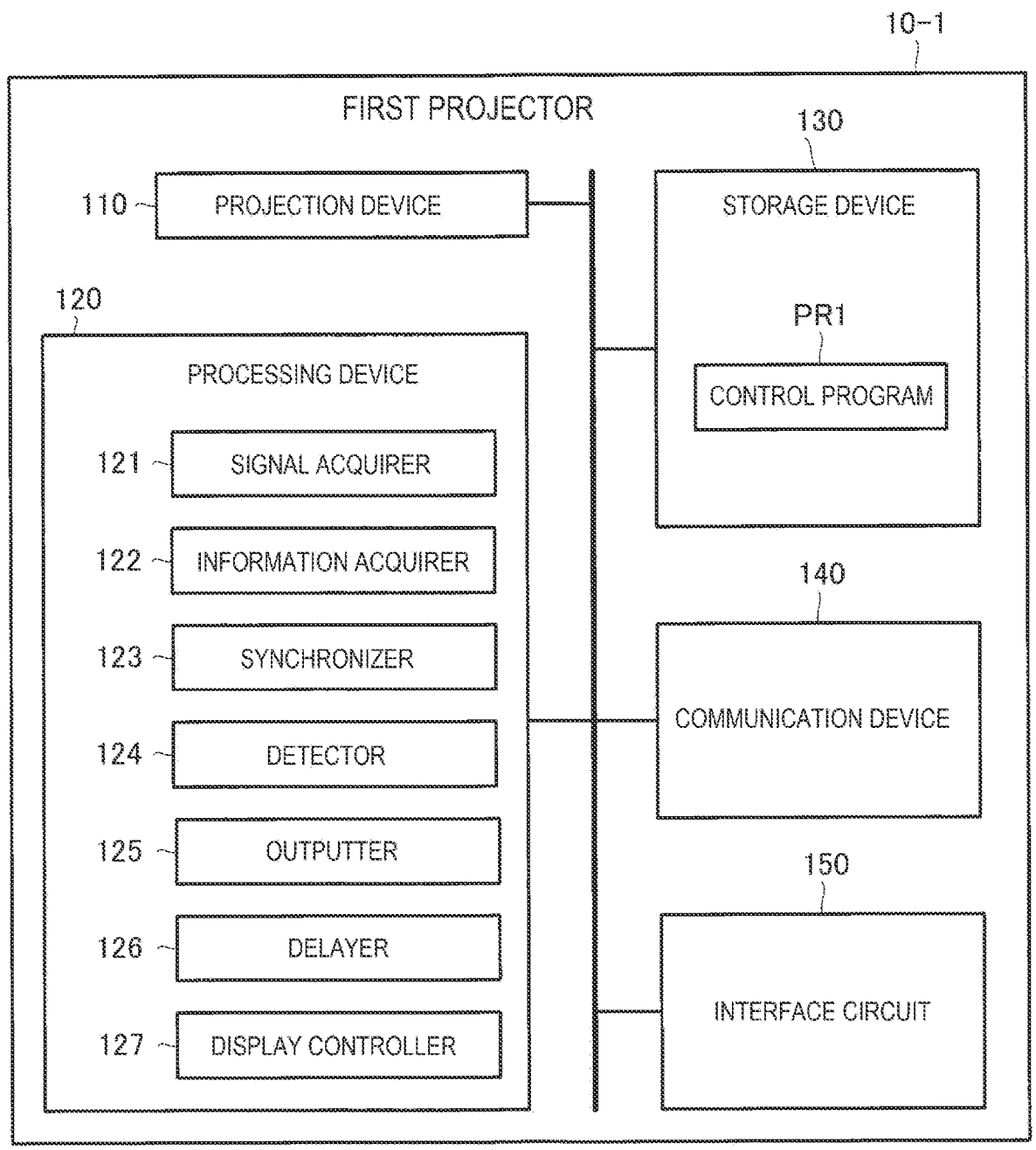
FIG. 2 is a block diagram showing the configuration of a first projector according to the first embodiment.

FIG. 2 is a block diagram showing the configuration of the first projector 10-1 according to the first embodiment. The first projector 10-1 has a projection device 110, a processing device 120, a storage device 130, a communication device 140, and an interface circuit 150. The elements of the first projector 10-1 are coupled to each other via a single or a plurality of buses for communicating information. Each element of the first projector 10-1 is formed of a single or a plurality of devices. A part of the elements of the first projector 10-1 may be omitted. The configuration of the second projector 10-2 is basically similar to the configuration of the first projector 10-1.

The projection device 110 is a device projecting the first image P1 onto a flat surface such as a screen or a wall, based on the first input image signal acquired from a display controller 127, described later. The projection device 110 includes, for example, a light source, a liquid crystal panel, and a projection lens. The projection device 110 modulates light from the light source, using the liquid crystal panel, and projects the modulated light onto a flat surface such as a screen or a wall via the projection lens.

The processing device 120 is a processor controlling the entirety of the first projector 10-1 and is formed of, for example, a single or a plurality of chips. The processing device 120 is formed of, for example, a central processing unit (CPU) including an interface with a peripheral device, a computing device, and a register. Apart or all of the functions of the processing device 120 may be implemented by hardware such as a DSP (digital signal processor), an ASIC (application-specific integrated circuit), a PLD (programmable logic device), or an FPGA (field-programmable gate array). The processing device 120 executes various kinds of processing in parallel or in sequence.

The storage device 130 is a recoding medium readable by the processing device 120 and stores a plurality of programs including a control program PR1 executed by the processing device 120. The control program PR1 may be transmitted from another device such as a server managing the first projector 10-1, via a communication network, not illustrated. The storage device 130 may be formed of, for example, at least one of a ROM (read-only memory), an EPROM (erasable programmable ROM), an EEPROM (electrically erasable programmable ROM), and a RAM (random-access memory). The storage device 130 may also be referred to as a register, a cache, a main memory, or a main storage device.

The communication device 140 is hardware as a transmitting and receiving device for communicating with another device. Particularly in this embodiment, the communication device 140 is a communication device for connecting the first projector 10-1 to the time server 30 via a wire or wirelessly. The communication device 140 is also referred to as, for example, a network device, a network controller, a network card, or a communication module.

The interface circuit 150 is an interface communicatively coupled to the first image output device 20-1. For example, the interface circuit 150 is an interface such as a USB (Universal Serial Bus) or an HDMI (High-Definition Multimedia Interface). "USB" is a registered trademark. The interface circuit 150 has a function of transmitting various information and various signals to the first image output device 20-1 and a function of receiving various information and various signals from the first image output device 20-1.

The processing device 120 reads out and executes the control program PR1 from the storage device 130 and thus functions as a signal acquirer 121, an information acquirer 122, a synchronizer 123, a detector 124, an outputter 125, a delayer 126, and a display controller 127.

The signal acquirer 121 acquires the first input image signal and the first input vertical synchronization signal from the first image output device 20-1 via the interface circuit 150.

Figure 3:
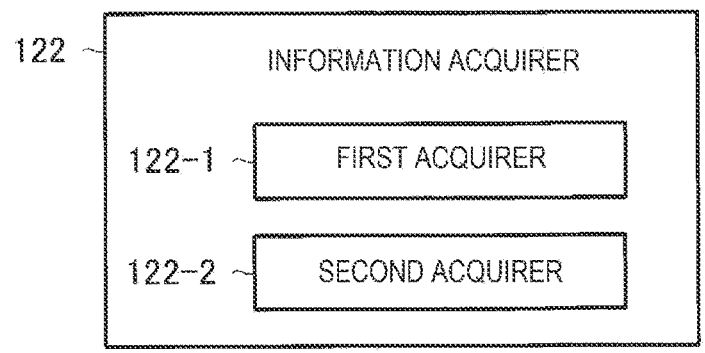
FIG. 3 is a functional block diagram showing the configuration of an information acquirer.

The information acquirer 122 acquires various information from an external device of the first projector 10-1. FIG. 3 is a functional block diagram showing the configuration of the information acquirer 122. The information acquirer 122 has a first acquirer 122-1 and a second acquirer 122-2.

The first acquirer 122-1 acquires the standard time from the time server 30 via the communication device 140.

The second acquirer 122-2 acquires a reference time, described later, from the second projector 10-2 via the communication device 140. The function of the second acquirer 122-2 will be described in detail later.

Referring back to FIG. 2, the synchronizer 123 synchronizes an internal time referred to in the processing by the first projector 10-1 with the standard time acquired by the first acquirer 122-1. The synchronizer 123 synchronizes the internal time with the standard time, for example, using a known protocol technique such as PTP (Precision Time Protocol) or NTP (Network Time Protocol).

The synchronizer 123 provided in the second projector 10-2 similarly synchronizes an internal time referred to in the processing by the second projector 10-2 with the standard time. Thus, both the internal time of the first projector 10-1 and the internal time of the second projector 10-2 are synchronized with the standard time.

The detector 124 detects a reference time, which is the internal time when an image represented by the input image signal acquired by the signal acquirer 121 satisfies a predetermined condition.

The "predetermined condition" may be, for example, that the image represented by the input image signal changes from a first input image to a second input image. The first input image may be, for example, a raster image that is red in its entirety. The second input image may be, for example, a raster image that is green in its entirety. In an example, by using two images in high contrast to each other as the first input image and the second input image, respectively, the detector 124 can more easily detect that the image represented by the input image signal has changed from the first input image to the second input image. In this case, the detector 124 detects, as the reference time, the internal time when it is detected that the image represented by the input image signal has changed from the first input image to the second input image.

Thus, the detector 124 can detect a lag in the synchronization of the input image signal between the first projector 10-1 and the second projector 10-2. Particularly, for example, by using raster images in high contrast to each other as the first input image and the second input image, the detector 124 can detect a lag in the synchronization of the input image signal more securely.

Alternatively, the "predetermined condition" may be, for example, that the image represented by the input image signal includes a predetermined image. To describe this in more detail, the area displayed by the first projector 10-1 includes a valid area visually recognized by the user, and an invalid area located outside the valid area and not visually recognized by the user. The predetermined image represented by the input image signal is displayed in the invalid area and not displayed in the valid area. Consequently, the user does not visually recognize the predetermined image. The predetermined image may include at least one of a predetermined character and a symbol. In this case, the detector 124 detects, as the reference time, the internal time when at least one of the predetermined character and the symbol is detected as the image in the invalid area included in the image represented by the input image signal.

To describe this in more detail, the liquid crystal panel provided in the projection device 110 has a first area corresponding to the valid area, and a second area corresponding to the invalid area. The image represented by the input image signal may include, for example, at least one of a predetermined character and a symbol, similarly to the above, as a predetermined image displayed in the second area and not displayed in the first area.

Thus, the detector 124 can detect a lag in the synchronization of the input image signal between the first projector 10-1 and the second projector 10-2. Particularly, based on whether the predetermined image exists or not, the detector 124 can detect a lag in the synchronization of the input image signal more securely.

Also, since the predetermined image for detecting a lag in the synchronization of the input image signal between the first projector 10-1 and the second projector 10-2 is displayed in the invalid area, which is not visually recognized by the user, the user can view the image represented by the input image signal without noticing whether the predetermined image exists or not.

The outputter 125 outputs the reference time detected by the detector 124 to the second projector 10-2 via the communication device 140. The outputter 125 provided in the second projector 10-2 similarly outputs the reference time detected by the detector 124 to the first projector 10-1 via the communication device 140. In this specification, the reference time detected by the first projector 10-1 is referred to as a "first reference time" and the reference time detected by the second projector 10-2 is referred to as a "second reference time".

As described above, the second acquirer 122-2 acquires the second reference time from the second projector 10-2 via the communication device 140. The second acquirer 122-2 provided in the second projector 10-2 similarly acquires the first reference time from the first projector 10-1 via the communication device 140.

In other words, the first projector 10-1 and the second projector 10-2 notify each other of the reference time detected by the first projector 10-1 and the second projector 10-2.

The delayer 126 delays the first input vertical synchronization signal acquired by the signal acquirer 121 by the time period from the first reference time to the second reference time, when the second reference time acquired from the second projector 10-2 is later than the first reference time. Meanwhile, when the second reference time acquired from the second projector 10-2 is the same as the first reference time or earlier than the first reference time, the delayer 126 performs no processing on the first input vertical synchronization signal.

The delayer 126 provided in the second projector 10-2 similarly delays the second input vertical synchronization signal acquired by the signal acquirer 121 by the time period from the second reference time to the first reference time, when the first reference time acquired from the first projector 10-1 is later than the second reference time. Meanwhile, when the first reference time acquired from the first projector 10-1 is the same as the second reference time or earlier than the second reference time, the delayer 126 provided in the second projector 10-2 performs no processing on the second input vertical synchronization signal.

The display controller 127 outputs the first input image signal to the projection device 110, using the first input vertical synchronization signal delayed by the delayer 126, when the second reference time is later than the first reference time. That is, the display controller 127 displays the first image P1 represented by the first input image signal, using the delayed first input vertical synchronization signal. Meanwhile, when the second reference time is the same as the first reference time or earlier than the first reference time, the display controller 127 outputs the first input image signal to the projection device 110, using the first input vertical synchronization signal that is not processed by the delayer 126. That is, the display controller 127 displays the first image P1 represented by the first input image signal, using the first input vertical synchronization signal that is not processed by the delayer 126.

The display controller 127 provided in the second projector 10-2 similarly outputs the second input image signal to the projection device 110, using the second input vertical synchronization signal delayed by the delayer 126, when the first reference time is later than the second reference time. That is, the display controller 127 provided in the second projector 10-2 displays the second image P2 represented by the second input image signal, using the delayed second input vertical synchronization signal. Meanwhile, when the first reference time is the same as the second reference time or earlier than the second reference time, the display controller 127 provided in the second projector 10-2 outputs the second input image signal to the projection device 110, using the second input vertical synchronization signal that is not processed by the delayer 126. That is, the display controller 127 provided in the second projector 10-2 displays the second image P2 represented by the second input image signal, using the second input vertical synchronization signal that is not processed by the delayer 126.

Thus, the first projector 10-1 can solve the problem in that, when a lag of one frame or more between projectors occurs in an image signal itself inputted to each of a plurality of projectors, an image is played back while the lag remains. Particularly, the first projector 10-1 can solve the problem caused by a lag in the synchronization of the input image signal, which cannot be solved simply by the synchronization of the internal time between the plurality of projectors.

1-1-3: Configuration of First Image Output Device 20-1

Figure 4:
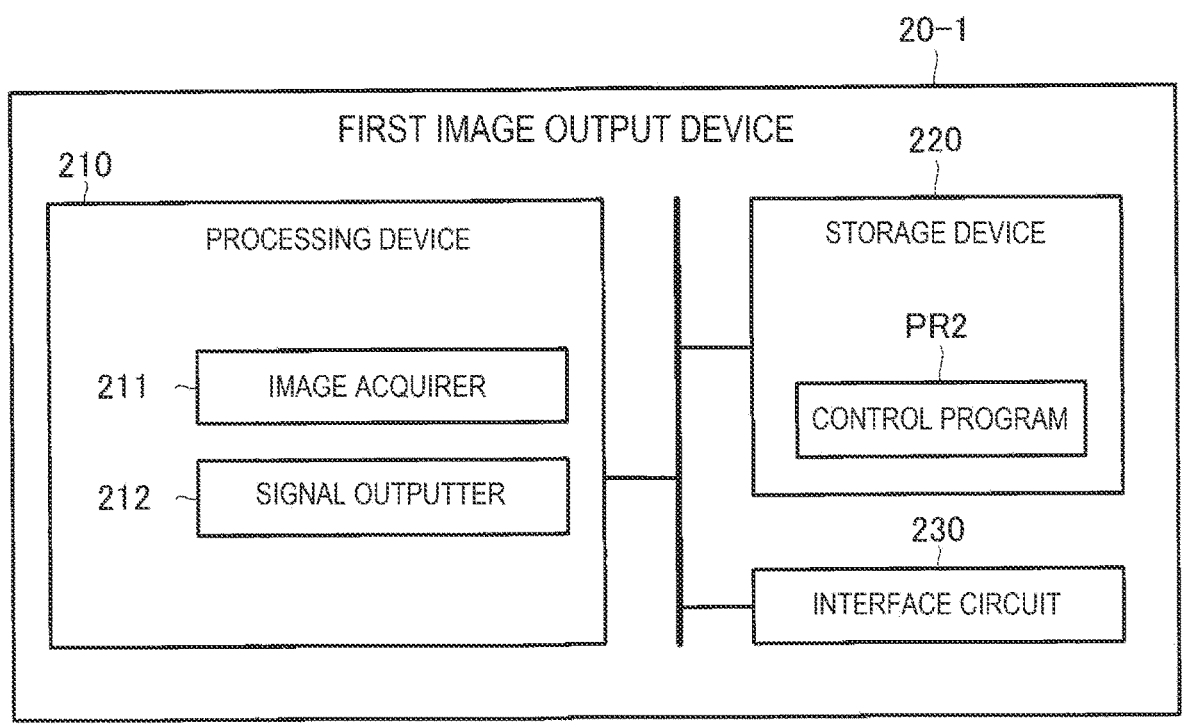
FIG. 4 is a block diagram showing the configuration of a first image output device according to the first embodiment.

FIG. 4 is a block diagram showing the configuration of the first image output device 20-1 according to the first embodiment. The first image output device 20-1 has a processing device 210, a storage device 220, and an interface circuit 230. The elements of the first image output device 20-1 are coupled to each other via a single or a plurality of buses for communicating information. Each element of the first image output device 20-1 is formed of a single or a plurality of devices. A part of the elements of the first image output device 20-1 may be omitted. The configuration of the second image output device 20-2 is basically similar to the configuration of the first image output device 20-1.

The processing device 210 is a processor controlling the entirety of the first image output device 20-1 and is formed of, for example, a single or a plurality of chips. The processing device 210 is formed of, for example, a central processing unit (CPU) including an interface with a peripheral device, a computing device, and a register. Apart or all of the functions of the processing device 210 may be implemented by hardware such as a DSP (digital signal processor), an ASIC (application-specific integrated circuit), a PLD (programmable logic device), or an FPGA (field-programmable gate array). The processing device 210 executes various kinds of processing in parallel or in sequence.

The storage device 220 is a recoding medium readable by the processing device 210 and stores a plurality of programs including a control program PR2 executed by the processing device 210. The control program PR2 may be transmitted from another device such as a server managing the first image output device 20-1, via a communication network, not illustrated. The storage device 220 may also store image information representing the first image P1. The storage device 220 may be formed of, for example, at least one of a ROM (read-only memory), an EPROM (erasable programmable ROM), an EEPROM (electrically erasable programmable ROM), and a RAM (random-access memory). The storage device 220 may also be referred to as a register, a cache, a main memory, or a main storage device.

The interface circuit 230 is an interface communicatively coupled to the first projector 10-1. For example, the interface circuit 230 is an interface such as a USB (Universal Serial Bus) or an HDMI (High-Definition Multimedia Interface). The interface circuit 230 has a function of transmitting various information and various signals to the first projector 10-1 and a function of receiving various information and various signals from the first projector 10-1.

The processing device 210 reads out and executes the control program PR2 from the storage device 220 and thus functions as an image acquirer 211 and a signal outputter 212.

The image acquirer 211 acquires image information representing an image from an external device of the first image output device 20-1 or from the storage device 220. Particularly, the image acquirer 211 acquires the image information representing the first image P1.

The image acquirer 211 provided in the second image output device 20-2 similarly acquires the image information representing the second image P2.

The signal outputter 212 generates the first input image signal to be used in the first projector 10-1, based on the image information acquired by the image acquirer 211, and outputs this first input image signal to the first projector 10-1 via the interface circuit 230. The signal outputter 212 also outputs the foregoing first input vertical synchronization signal to the first projector 10-1 via the interface circuit 230.

The signal outputter 212 provided in the second image output device 20-2 similarly outputs the second input image signal and the second input vertical synchronization signal to the second projector 10-2 via the interface circuit 230.

1-2: Operations in Embodiment

Figure 5:
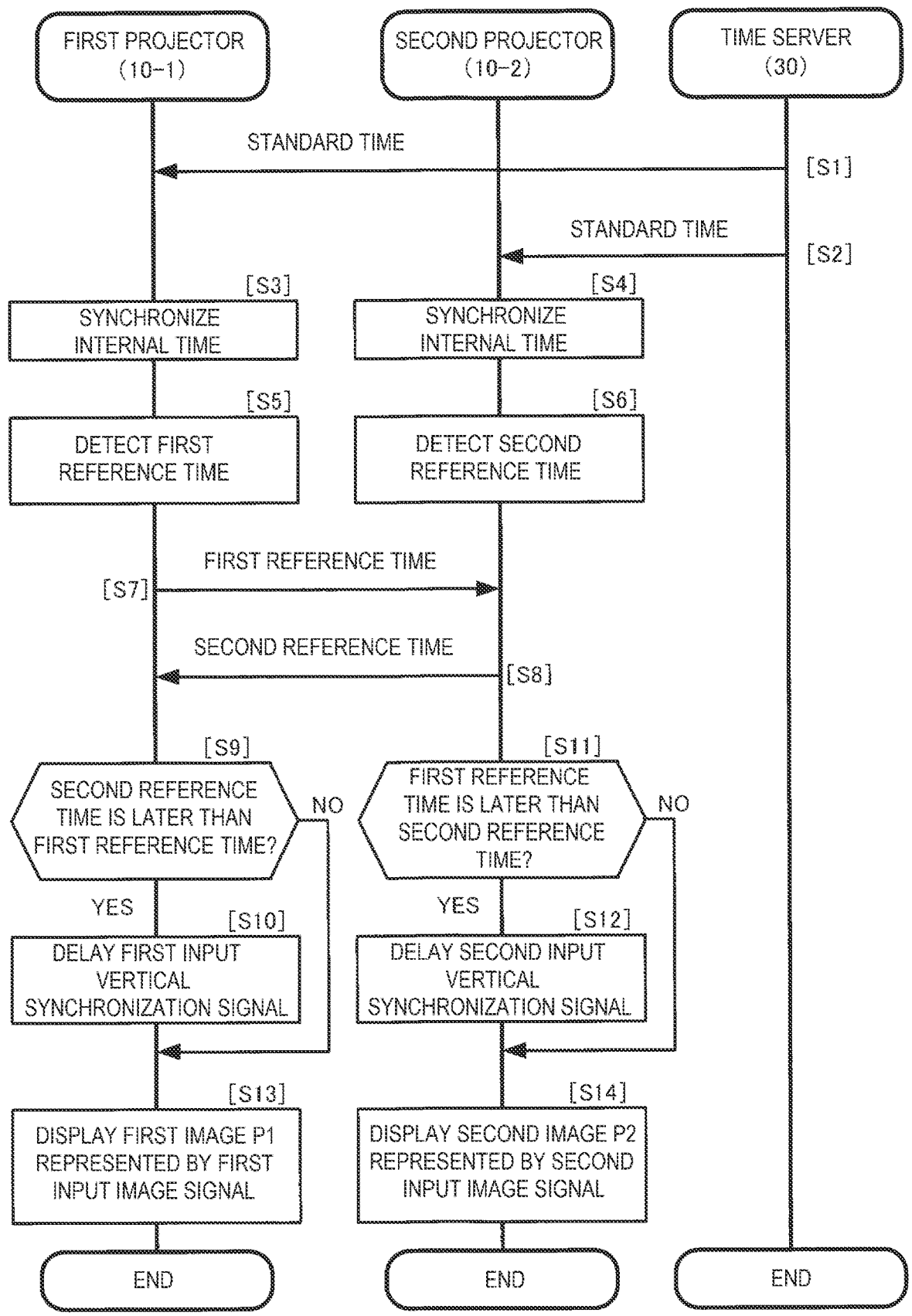
FIG. 5 is a sequence chart showing operations of the display control system according to the first embodiment.

FIG. 5 is a sequence chart showing operations of the display control system 1 according to the first embodiment. The operations of the display control system 1 will now be described with reference to FIG. 5.

In step S1, the processing device 120 provided in the first projector 10-1 functions as the first acquirer 122-1. The processing device 120 acquires the standard time from the time server 30.

In step S2, the processing device 120 provided in the second projector 10-2 functions as the first acquirer 122-1. The processing device 120 acquires the standard time from the time server 30.

In step S3, the processing device 120 provided in the first projector 10-1 functions as the synchronizer 123. The processing device 120 synchronizes the internal time referred to in the processing by the first projector 10-1 with the standard time acquired in step S1.

In step S4, the processing device 120 provided in the second projector 10-2 functions as the synchronizer 123. The processing device 120 synchronizes the internal time referred to in the processing by the second projector 10-2 with the standard time acquired in step S2.

In step S5, the processing device 120 provided in the first projector 10-1 functions as the detector 124. The processing device 120 detects the first reference time, which is the internal time when the image represented by the first input image signal satisfies a predetermined condition.

In step S6, the processing device 120 provided in the second projector 10-2 functions as the detector 124. The processing device 120 detects the second reference time, which is the internal time when the image represented by the second input image signal satisfies a predetermined condition.

In step S7, the processing device 120 provided in the first projector 10-1 functions as the outputter 125. The processing device 120 provided in the first projector 10-1 outputs the first reference time detected in step S5 to the second projector 10-2. The processing device 120 provided in the second projector 10-2 functions as the second acquirer 122-2. The processing device 120 provided in the second projector 10-2 acquires the first reference time from the first projector 10-1.

In step S8, the processing device 120 provided in the second projector 10-2 functions as the outputter 125. The processing device 120 provided in the second projector 10-2 outputs the second reference time detected in step S6 to the first projector 10-1. The processing device 120 provided in the first projector 10-1 functions as the second acquirer 122-2. The processing device 120 provided in the first projector 10-1 acquires the second reference time from the second projector 10-2.

In step S9, the processing device 120 provided in the first projector 10-1 functions as the delayer 126. The processing device 120 compares the first reference time detected by the processing device 120 with the second reference time acquired from the second projector 10-2. When the second reference time is later than the first reference time, that is, when the result of the determination in step S9 is positive, the processing device 120 executes the processing of step S10. Meanwhile, when the second reference time is the same as the first reference time or earlier than the first reference time, that is, when the result of the determination in step S9 is negative, the processing device 120 executes the processing of step S13.

In step S10, the processing device 120 provided in the first projector 10-1 functions as the delayer 126. The processing device 120 delays the first input vertical synchronization signal by the time period from the first reference time to the second reference time.

In step S11, the processing device 120 provided in the second projector 10-2 functions as the delayer 126. The processing device 120 compares the second reference time detected by the processing device 120 with the first reference time acquired from the first projector 10-1. When the first reference time is later than the second reference time, that is, when the result of the determination in step S11 is positive, the processing device 120 executes the processing of step S12. Meanwhile, when the first reference time is the same as the second reference time or earlier than the second reference time, that is, when the result of the determination in step S11 is negative, the processing device 120 executes the processing of step S14.

In step S12, the processing device 120 provided in the second projector 10-2 functions as the delayer 126. The processing device 120 delays the second input vertical synchronization signal by the time period from the second reference time to the first reference time.

In step S13, the processing device 120 provided in the first projector 10-1 functions as the display controller 127. The processing device 120 displays the first image P1 represented by the first input image signal, using the first input vertical synchronization signal.

In step S14, the processing device 120 provided in the second projector 10-2 functions as the display controller 127. The processing device 120 displays the second image P2 represented by the second input image signal, using the second input vertical synchronization signal.

1-3: Effects Achieved by Embodiment

The display control method according to this embodiment is a display control method for controlling the first projector 10-1, which is one display device of a plurality of display devices in the display control system 1 for synchronizing images displayed by the plurality of display devices. The display control method includes: acquiring the standard time; synchronizing the internal time referred to in the processing by the first projector 10-1 with the standard time; detecting the first reference time, which is the internal time when the image represented by the first input image signal satisfies a predetermined condition; outputting the first reference time to the second projector 10-2, which is another display device of the plurality of display devices; acquiring the second reference time detected in the second projector 10-2; delaying the first input vertical synchronization signal by the time period from the first reference time of the first projector 10-1 to the second reference time of the second projector 10-2, when the second reference time of the second projector 10-2 is later than the first reference time of the first projector 10-1; and displaying the image represented by the first input image signal, using the delayed first input vertical synchronization signal.

The display control method can solve the problem in that, when a lag of one frame or more between projectors occurs in an image signal itself inputted to each of a plurality of projectors, an image is played back while the lag remains. Thus, the display control method can solve the problem caused by a lag in the synchronization of the input image signal, which cannot be solved simply by the synchronization of the internal time between the plurality of projectors.

In the display control method, the predetermined condition is that the image represented by the input image signal changes from the first input image to the second input image.

By employing the condition that the image represented by the input image signal changes from the first input image to the second input image, as the predetermined condition, the first projector 10-1 can detect a lag in the synchronization of the input image signal between the first projector 10-1 and the second projector 10-2. Particularly, for example, by using raster images in high contrast to each other as the first input image and the second input image, the first projector 10-1 can detect a lag in the synchronization of the input image signal more securely.

In the display control method, the predetermined condition is that the image represented by the input image signal includes a predetermined image.

By employing the condition that the image represented by the input image signal includes a predetermined image, as the predetermined condition, the first projector 10-1 can detect a lag in the synchronization of the input image signal between the first projector 10-1 and the second projector 10-2. Particularly, based on whether the predetermined image exists or not, the first projector 10-1 can detect a lag in the synchronization of the input image signal more securely.

In the display control method, the image represented by the input image signal is displayed by the first projector 10-1. The area displayed by the first projector 10-1 includes a valid area visually recognized by the user, and an invalid area located outside the valid area and not visually recognized by the user. The predetermined image is displayed in the invalid area and not displayed in the valid area.

Since the predetermined image for detecting a lag in the synchronization of the input image signal between the first projector 10-1 and the second projector 10-2 is displayed in the invalid area, which is not visually recognized by the user, the user can view the image represented by the input image signal without noticing whether the predetermined image exists or not.

The display device according to this embodiment is the first projector 10-1, which is one display device in the display control system 1 for synchronizing images displayed by the plurality of display devices. The first projector 10-1 has the first acquirer 122-1, the synchronizer 123, the detector 124, the outputter 125, the second acquirer 122-2, the delayer 126, and the display controller 127. The first acquirer 122-1 acquires the standard time. The synchronizer 123 synchronizes the internal time referred to in the processing by the first projector 10-1 with the standard time. The detector 124 detects the first reference time, which is the internal time when the image represented by the first input image signal satisfies a predetermined condition. The outputter 125 outputs the first reference time to the second projector 10-2, which is another display device of the plurality of display devices. The second acquirer 122-2 acquires the second reference time detected in the second projector 10-2. The delayer 126 delays the first input vertical synchronization signal by the time period from the first reference time to the second reference time, when the second reference time is later than the first reference time. The display controller 127 displays the image represented by the first input image signal, using the delayed first input vertical synchronization signal.

The first projector 10-1 as the display device can solve the problem in that, when a lag of one frame or more between projectors occurs in an image signal itself inputted to each of a plurality of projectors, an image is played back while the lag remains. Particularly, the first projector 10-1 can solve the problem caused by a lag in the synchronization of the input image signal, which cannot be solved simply by the synchronization of the internal time between the plurality of projectors.

2: SECOND EMBODIMENT 2-1: Configuration of Embodiment
2-1-1: Overall Configuration A display control system LA according to a second embodiment has a first projector 10A-1 instead of the first projector 10-1 and has a second projector 10A-2 instead of the second projector 10-2, in contrast to the display control system 1 according to the first embodiment. With respect to the other parts, the overall configuration of the display control system 1A according to the second embodiment is similar to the overall configuration of the display control system 1 according to the first embodiment and therefore the illustration thereof is omitted.

In the description below, of the component elements provided in the display control system 1A according to the second embodiment, the same component elements as the component elements provided in the display control system 1 according to the first embodiment are denoted by the same reference signs. In order to simplify the description, basically the description of the functions of the same component elements is omitted. Also, in order to simplify the description, the differences between the display control system 1A according to the second embodiment and the display control system 1 according to the first embodiment will be mainly described below.

2-1-2: Configuration of First Projector 10A-1

Figure 6:
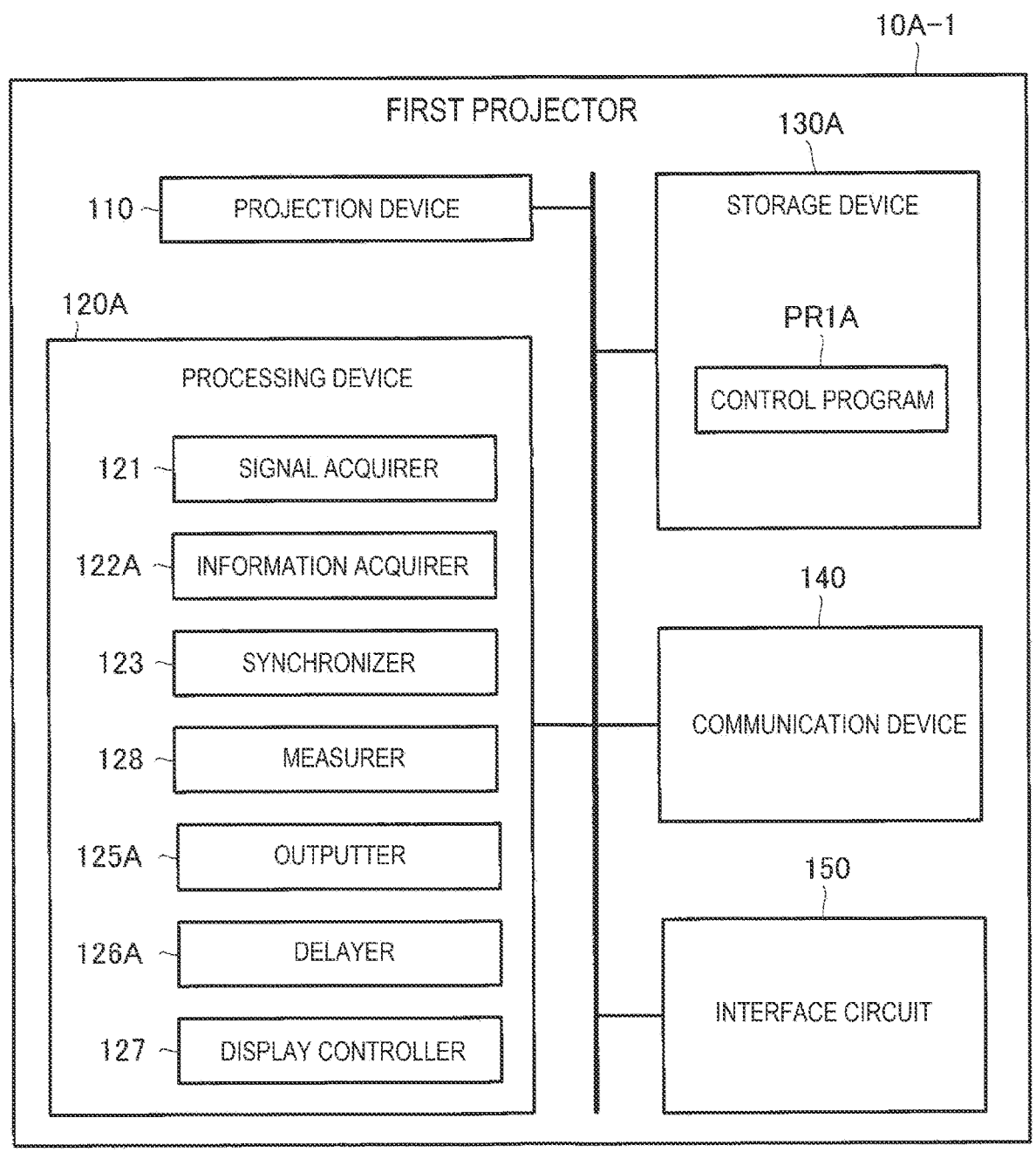
FIG. 6 is a block diagram showing the configuration of a first projector according to a second embodiment.

FIG. 6 is a block diagram showing the configuration of the first projector 10A-1 according to the second embodiment. The first projector 10A-1 according to the second embodiment has a processing device 120A instead of the processing device 120 and has a storage device 130A instead of the storage deice 130, in contrast to the first projector 10-1 according to the first embodiment.

The storage device 130A stores a control program PR1A instead of the control program PR1 provided in the storage device 130.

The processing device 120A has an information acquirer 122A instead of the information acquirer 122 provided in the processing device 120, an outputter 125A instead of the outputter 125, and a delayer 126A instead of the delayer 126. The processing device 120A also has a measurer 128 instead of the detector 124 provided in the processing device 120. The processing device 120A reads out and executes the control program. PR1A from the storage device 130A and thus functions as the signal acquirer 121, the information acquirer 122A, the synchronizer 123, the measurer 128, the outputter 125A, the delayer 126A, and the display controller 127.

Figure 7:
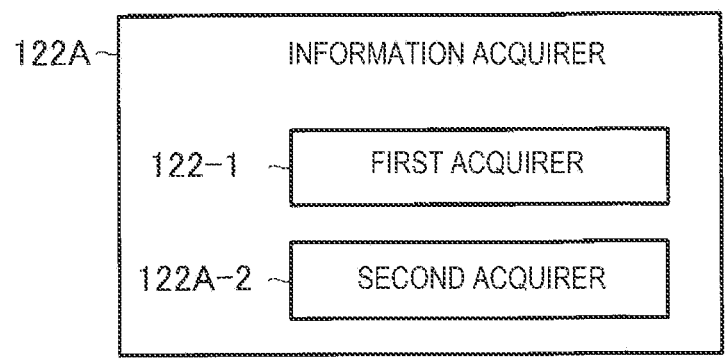
FIG. 7 is a functional block diagram of an information acquirer.

FIG. 7 is a functional block diagram of the information acquirer 122A. The information acquirer 122A has a second acquirer 122A-2 instead of the second acquirer 122-2 provided in the information acquirer 122. The function of the second acquirer 122A-2 will be described later.

Referring back to FIG. 6, the measurer 128 measures a reference time period, which is the time period until the first input vertical synchronization signal is acquired for the first time after the internal time reaches a first time.

The outputter 125A outputs the reference time period measured by the measurer 128 to the second projector 10A-2 via the communication device 140. The outputter 125A provided in the second projector 10A-2 similarly outputs the reference time period measured by the measurer 128 to the first projector 10A-1 via the communication device 140. In this specification, the reference time period measured in the first projector 10A-1 is referred to as a "first reference time period" and the reference time period measured in the second projector 10A-2 is referred to as a "second reference time period".

The second acquirer 122A-2 acquires the second reference time period from the second projector 10A-2 via the communication device 140. The second acquirer 122A-2 provided in the second projector 10A-2 similarly acquires the first reference time period from the first projector 10A-1 via the communication device 140.

In other words, the first projector 10A-1 and the second projector 10A-2 notify each other of the reference time periods measured in the first projector 10A-1 and the second projector 10A-2.

The delayer 126A delays the first input vertical synchronization signal acquired by the signal acquirer 121 by the time period of the difference between the first reference time period and the second reference time period, when the second reference time period acquired from the second projector 10A-2 is longer than the first reference time period. Meanwhile, when the second reference time period acquired from the second projector 10A-2 is the same as the first reference time period or shorter than the first reference time period, the delayer 126A performs no processing on the first input vertical synchronization signal.

The delayer 126A provided in the second projector 10A-2 similarly delays the second input vertical synchronization signal acquired by the signal acquirer 121 by the time period of the difference between the first reference time period and the second reference time period, when the first reference time period acquired from the first projector 10A-1 is longer than the second reference time period. Meanwhile, when the first reference time period acquired from the first projector 10A-1 is the same as the second reference time period or shorter than the second reference time period, the delayer 126A provided in the second projector 10A-2 performs no processing on the second input vertical synchronization signal.

Thus, the first projector 10A-1 can solve the problem in that, when a lag of one frame or more between projectors occurs in an image signal itself inputted to each of a plurality of projectors, an image is played back while the lag remains. Particularly, the first projector 10A-1 can solve the problem caused by a lag in the synchronization of the input image signal, which cannot be solved simply by the synchronization of the internal time between the plurality of projectors.

A plurality of the first times may be set. Every time the internal time reaches the first time, the measurer 128 measures the reference time period, which is the time period until the first input vertical synchronization signal is acquired for the first time after the first time. Subsequently, the outputter 125A, the second acquirer 122A-2, the delayer 126A, and the display controller 127 repeat the foregoing operations.

Thus, the first projector 10A-1 can readjust the time period by which the first input vertical synchronization signal is delayed, for example, at every fixed time.

2-2: Operations in Embodiment

Figure 8:
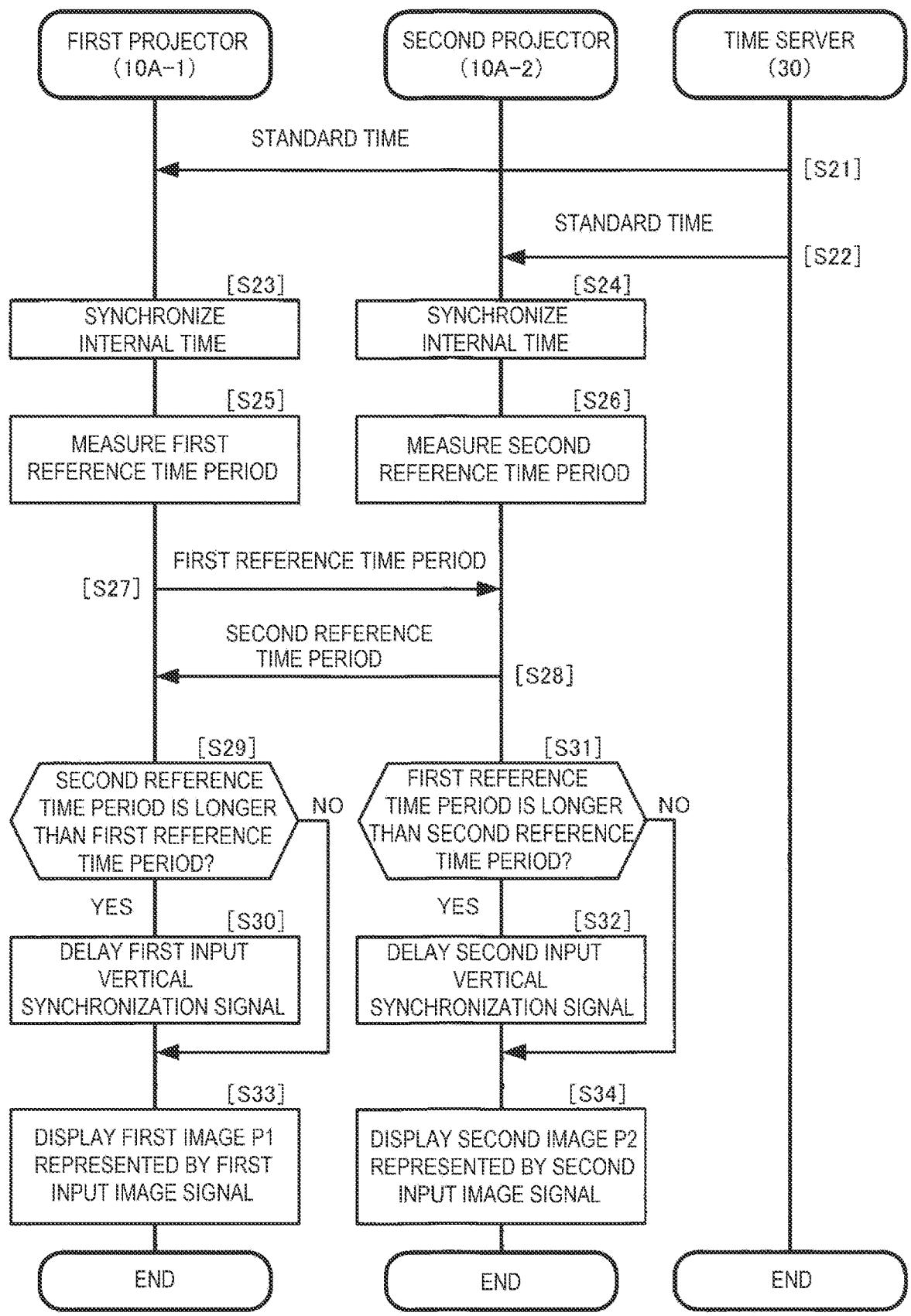
FIG. 8 is a sequence chart showing operations of a display control system according to the second embodiment.

FIG. 8 is a sequence chart showing operations of the display control system 1A according to the second embodiment. The operations of the display control system 1A will now be described with reference to FIG. 8.

In step S21, the processing device 120A provided in the first projector 10A-1 functions as the first acquirer 122-1. The processing device 120A acquires the standard time from the time server 30.

In step S22, the processing device 120A provided in the second projector 10A-2 functions as the first acquirer 122-1. The processing device 120A acquires the standard time from the time server 30.

In step S23, the processing device 120A provided in the first projector 10A-1 functions as the synchronizer 123. The processing device 120A synchronizes the internal time referred to in the processing by the first projector 10A-1 with the standard time acquired in step S21.

In step S24, the processing device 120A provided in the second projector 10A-2 functions as the synchronizer 123. The processing device 120A synchronizes the internal time referred to in the processing by the second projector 10A-2 with the standard time acquired in step S22.

In step S25, the processing device 120A provided in the first projector 10A-1 functions as the measurer 128. The processing device 120A measures the first reference time period, which is the time period until the first input vertical synchronization signal is acquired for the first time after the internal time reaches the first time.

In step S26, the processing device 120A provided in the second projector 10A-2 functions as the measurer 128. The processing device 120A measures the second reference time period, which is the time period until the second input vertical synchronization signal is acquired for the first time after the internal time reaches the first time.

In step S27, the processing device 120A provided in the first projector 10A-1 functions as the outputter 125A. The processing device 120A provided in the first projector 10A-1 outputs the first reference time period measured in step S25 to the second projector 10A-2. The processing device 120A provided in the second projector 10A-2 functions as the second acquirer 122A-2. The processing device 120A provided in the second projector 10A-2 acquires the first reference time period from the first projector 10A-1.

In step S28, the processing device 120A provided in the second projector 10A-2 functions as the outputter 125A. The processing device 120A provided in the second projector 10A-2 outputs the second reference time period measured in step S26 to the first projector 10A-1. The processing device 120A provided in the first projector 10A-1 functions as the second acquirer 122A-2. The processing device 120A provided in the first projector 10A-1 acquires the second reference time period from the second projector 10A-2.

In step S29, the processing device 120A provided in the first projector 10A-1 functions as the delayer 126A. The processing device 120A compares the first reference time period measured by the processing device 120A with the second reference time period acquired from the second projector 10A-2. When the second reference time period is longer than the first reference time period, that is, when the result of the determination in step S29 is positive, the processing device 120A executes the processing of step S30. Meanwhile, when the second reference time period is the same as the first reference time period or shorter than the first reference time period, that is, when the result of the determination in step S29 is negative, the processing device 120A executes the processing of step S33.

In step S30, the processing device 120A provided in the first projector 10A-1 functions as the delayer 126A. The processing device 120A delays the first input vertical synchronization signal by the time period of the difference between the first reference time period and the second reference time period.

In step S31, the processing device 120A provided in the second projector 10A-2 functions as the delayer 126A. The processing device 120A compares the second reference time period measured by the processing device 120A with the first reference time period acquired from the first projector 10A-1. When the first reference time period is longer than the second reference time period, that is, when the result of the determination in step S31 is positive, the processing device 120A executes the processing of step S32. Meanwhile, when the first reference time period is the same as the second reference time period or shorter than the second reference time period, that is, when the result of the determination in step S31 is negative, the processing device 120A executes the processing of step S34.

In step S32, the processing device 120A provided in the second projector 10A-2 functions as the delayer 126A. The processing device 120A delays the second input vertical synchronization signal by the time period of the difference between the first reference time period and the second reference time period.

In step S33, the processing device 120A provided in the first projector 10A-1 functions as the display controller 127. The processing device 120A displays the first image P1 represented by the first input image signal, using the first input vertical synchronization signal.

In step S34, the processing device 120A provided in the second projector 10A-2 functions as the display controller 127. The processing device 120A displays the second image P2 represented by the second input image signal, using the second input vertical synchronization signal.

2-3: Effects Achieved by Embodiment

The display control method according to this embodiment is a display control method for controlling the first projector 10A-1, which is one display device of a plurality of display devices in the display control system 1A for synchronizing images displayed by the plurality of display devices. The display control method includes: acquiring the standard time; synchronizing the internal time referred to in the processing by the first projector 10A-1 with the standard time; measuring the first reference time period, which is the time period until the vertical synchronization signal is acquired for the first time after the internal time reaches the first time; outputting the first reference time period to the second projector 10A-2, which is another display device of the plurality of display devices; acquiring the second reference time period measured in the second projector 10A-2; delaying the first input vertical synchronization signal by the time period of the difference between the first reference time period of the first projector 10A-1 and the second reference time period of the second projector 10A-2, when the second reference time period of the second projector 10A-2 is longer than the first reference time period of the first projector 10A-1; and displaying the image represented by the first input image signal, using the delayed first input vertical synchronization signal.

The display control method can solve the problem in that, when a lag of one frame or more between projectors occurs in an image signal itself inputted to each of a plurality of projectors, an image is played back while the lag remains. Particularly, the display control method can solve the problem caused by a lag in the synchronization of the input image signal, which cannot be solved simply by the synchronization of the internal time between the plurality of projectors.

In the display control method, a plurality of the first times are set.

As a plurality of the first times are set, the first projector 10A-1 can readjust the time period by which the first input vertical synchronization signal is delayed, for example, at every fixed time.

The display device according to this embodiment is the first projector 10A-1, which is one display device in the display control system 1A for synchronizing images displayed by the plurality of display devices. The first projector 10A-1 has the first acquirer 122-1, the synchronizer 123, the measurer 128, the outputter 125A, the second acquirer 122A-2, the delayer 126A, and the display controller 127. The first acquirer 122-1 acquires the standard time. The synchronizer 123 synchronizes the internal time referred to in the processing by the first projector 10A-1 with the standard time. The measurer 128 measures the first reference time period, which is the time period until the vertical synchronization signal is acquired for the first time after the internal time reaches the first time. The outputter 125A outputs the first reference time period to the second projector 10A-2, which is another display device of the plurality of display devices. The second acquirer 122A-2 acquires the second reference time period measured in the second projector 10A-2. The delayer 126A delays the first input vertical synchronization signal by the time period of the difference between the first reference time period and the second reference time period, when the second reference time period is longer than the first reference time period. The display controller 127 displays the image represented by the first input image signal, using the delayed first input vertical synchronization signal.

The first projector 10A-1 as the display device can solve the problem in that, when a lag of one frame or more between projectors occurs in an image signal itself inputted to each of a plurality of projectors, an image is played back while the lag remains. Particularly, the first projector 10A-1 can solve the problem caused by a lag in the synchronization of the input image signal, which cannot be solved simply by the synchronization of the internal time between the plurality of projectors.

3: MODIFICATION EXAMPLES

The present disclosure is not limited to the foregoing embodiments. Specific forms of modification are given below.

3-1: Modification Example 1

In the display control system 1 according to the first embodiment, the first image output device 20-1 outputs the first input image signal to the first projector 10-1. Also, the second image output device 20-2 outputs the second input image signal to the second projector 10-2. However, a first USB memory in which first image information representing the first image P1 is stored may be inserted in the first projector 10-1, and the first projector 10-1 may read the first image information from the first USB memory and thus display the first image P1. Similarly, a second USB memory in which second image information representing the second image P2 is stored may be inserted in the second projector 10-2, and the second projector 10-2 may read the second image information from the second USB memory and thus display the second image P2. In these cases, the first projector 10-1 itself generates a vertical synchronization signal to be used when displaying the first image P1, instead of the first input vertical synchronization signal acquired from the first image output device 20-1. Also, the first projector 10-1 delays the generated vertical synchronization signal generated by the first projector 10-1 itself, based on the reference time. Similarly, the second projector 10-2 itself generates a vertical synchronization signal to be used when displaying the second image P2, instead of the second input vertical synchronization signal acquired from the second image output device 20-2. Also, the second projector 10-2 delays the generated vertical synchronization signal generated by the second projector 10-2 itself, based on the reference time. The same applies to the display control system 1A according to the second embodiment.

3-2: Modification Example 2

In the display control system 1 according to the first embodiment, the first image output device 20-1 outputs the first input image signal corresponding to the first image P1, to the first projector 10-1. Also, the second image output device 20-2 outputs the second input image signal corresponding to the second image P2, to the second projector 10-2. However, for example, the first image output device 20-1 may output input image signals corresponding to both the first image P1 and the second image P2, to the first projector 10-1, and the first projector 10-1 may output the input image signal corresponding to the second image P2, to the second projector 10-2. Alternatively, the second image output device 20-2 may output input image signals corresponding to both the first image P1 and the second image P2, to the second projector 10-2, and the second projector 10-2 may output the input image signal corresponding to the first image P1, to the first projector 10-1.

3-3: Modification Example 3

In the display control system 1 according to the first embodiment, the first image output device 20-1 is directly coupled to the first projector 10-1, for example, via an HDMI cable. Similarly, the second image output device 20-2 is directly coupled to the second projector 10-2, for example, via an HDMI cable. However, the first image output device 20-1 may be mutually communicatively coupled to the first projector 10-1 via the communication network NET. Similarly, the second image output device 20-2 may be mutually communicatively coupled to the the second projector 10-2 via the communication network NET. The same applies to the display control system 1A according to the second embodiment.

What is claimed is:

1. A display control method comprising:
   acquiring a standard time;
   synchronizing an internal time referred to in processing by one display device of a plurality of display devices, with the standard time;
   detecting a reference time, which is the internal time when an image represented by an input image signal satisfies a condition;
   outputting the reference time to another display device of the plurality of display devices;
   acquiring a reference time detected in the another display device;
   delaying a vertical synchronization signal by a time period from the reference time of the one display device to the reference time of the another display device, when the reference time of the another display device is later than the reference time of the one display device; and
   displaying the image represented by the input image signal, using the delayed vertical synchronization signal, wherein
   the condition is that the image represented by the input image signal includes a predetermined image,
   the image represented by the input image signal is displayed by the one display device,
   an area displayed by the one display device includes a valid area visually recognized by a user, and an invalid area located outside the valid area and not visually recognized by the user, and
   the predetermined image is displayed in the invalid area and not displayed in the valid area.

2. The display control method according to claim 1, wherein
   the condition is that the image represented by the input image signal changes from a first input image to a second input image.

3. A display device that is one display device of a plurality of display devices in a system for synchronizing images displayed by the plurality of display devices, the display device comprising:
   a processing device programmed to execute
      acquiring a standard time;
      synchronizing an internal time referred to in processing by the one display device with the standard time;
      detecting a reference time, which is the internal time when an image represented by an input image signal satisfies a condition;
      outputting the reference time to another display device of the plurality of display devices;
      acquiring a reference time detected in the another display device;
      delaying a vertical synchronization signal by a time period from the reference time of the one display device to the reference time of the another display device, when the reference time of the another display device is later than the reference time of the one display device; and
      displaying the image represented by the input image signal, using the delayed vertical synchronization signal, wherein
      the condition is that the image represented by the input image signal includes a predetermined image, the image represented by the input image signal is displayed by the one display device, an area displayed by the one display device includes a valid area visually recognized by a user, and an invalid area located outside the valid area and not visually recognized by the user, and the predetermined image is displayed in the invalid area and not displayed in the valid area.

\* \* \* \* \*